US008627124B2

(12) United States Patent
Carter et al.

(10) Patent No.: US 8,627,124 B2
(45) Date of Patent: Jan. 7, 2014

(54) TECHNIQUES FOR PERFORMING STORAGE POWER MANAGEMENT

(75) Inventors: John B. Carter, Austin, TX (US);
Wesley M. Felter, Austin, TX (US);
Anthony N. Hylick, Austin, TX (US);
Malcolm S. Ware, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 13/024,605

(22) Filed: Feb. 10, 2011

(65) Prior Publication Data
US 2012/0210149 A1  Aug. 16, 2012

(51) Int. Cl.
*G06F 1/32* (2006.01)
(52) U.S. Cl.
USPC .......................................................... 713/320
(58) Field of Classification Search
USPC ................................................. 713/300–340
See application file for complete search history.

(56) References Cited

U.S. PATENT DOCUMENTS

| | | | | |
|---|---|---|---|---|
| 4,984,103 | A * | 1/1991 | Nigam .......................... | 360/74.1 |
| 5,404,487 | A * | 4/1995 | Murata et al. ................. | 711/113 |
| 5,493,670 | A * | 2/1996 | Douglis et al. ................ | 713/324 |
| 5,574,920 | A * | 11/1996 | Parry ............................. | 713/340 |
| 5,898,880 | A * | 4/1999 | Ryu ............................... | 713/323 |
| 6,415,388 | B1 * | 7/2002 | Browning et al. ............ | 713/322 |
| 6,859,886 | B1 * | 2/2005 | Johnson ......................... | 713/600 |
| 7,062,675 | B1 * | 6/2006 | Kemeny et al. ................ | 714/15 |
| 7,337,339 | B1 * | 2/2008 | Choquette et al. ............ | 713/320 |
| 7,426,647 | B2 * | 9/2008 | Fleck et al. .................... | 713/320 |
| 7,539,881 | B2 | 5/2009 | Shaw et al. | |
| 7,596,638 | B2 * | 9/2009 | Lee et al. ........................ | 710/18 |
| 7,634,585 | B2 * | 12/2009 | Conley et al. ..................... | 710/1 |
| 7,640,231 | B2 * | 12/2009 | Alvarez et al. ........................ | 1/1 |
| 8,072,704 | B1 * | 12/2011 | Goldberg et al. .......... | 360/78.06 |
| 2005/0102544 | A1 | 5/2005 | Brewer et al. | |
| 2008/0301473 | A1 * | 12/2008 | Perez et al. .................... | 713/300 |
| 2008/0320323 | A1 | 12/2008 | Brittain et al. | |
| 2010/0332871 | A1 * | 12/2010 | Allalouf et al. ............... | 713/320 |

OTHER PUBLICATIONS

Chen et al., 'Leveraging Disk Drive Acoustic Modes for Power Management'; IBM Research—Haifa, Israel; 26th IEEE (MSST2010) Symposium on Massive Storage Systems and Technologies; http://storageconference.org/2010/Papers/MSST/Chen.pdf.

* cited by examiner

*Primary Examiner* — Paul R Myers
(74) *Attorney, Agent, or Firm* — Yudell Isidore Ng Russell PLLC (57) ABSTRACT

A technique for performing storage power management on storage subsystems includes measuring, using a power measurement device, power consumption of a storage subsystem. A first average power and a second average power for the storage subsystem are calculated based on the measured power consumption. In this case, the first average power is calculated over a shorter time period than the second average power. One or more first actuators are incremented in response to the first average power of the storage subsystem being greater than a first power level to reduce the first average power of the storage subsystem below the first power level within a first time period. One or more second actuators are incremented in response to the second average power of the storage subsystem being greater than a second power level and less than the first power level to reduce the second average power of the storage subsystem below the second power level within a second time period that is greater than the first time period. Finally, one or more of the first actuators and the second actuators are decremented in response to the second average power of the storage subsystem being more than an offset below the second power level to increase the power consumption of the storage subsystem.

18 Claims, 6 Drawing Sheets

TECHNIQUES FOR PERFORMING STORAGE POWER MANAGEMENT

BACKGROUND

1. Technical Field

The present invention generally relates to power management and in particular to techniques for performing storage power management.

2. Description of the Related Art

Power management has been implemented as a feature of some electrical appliances (e.g., copiers, computer systems, and computer system peripherals, such as monitors and printers) to turn off appliance power or switch the appliance to a low-power state when the appliance is inactive. In computing, personal computer (PC) power management has been built around the advanced configuration and power interface (ACPI) standard. The ACPI standard provides for unified operating system (OS) device configuration and power management and defines platform independent interfaces for hardware discovery, configuration, power management, and monitoring.

In general, computer system power management is desirable to: reduce overall energy consumption; prolong battery life for portable and embedded systems; reduce cooling requirements; reduce noise; and reduce operating costs associated with energy and cooling. Reduced power consumption leads to reduced heat dissipation (which increases system stability) and less energy use (which saves money and reduces environmental impact). Power management for processors can be implemented over an entire processor or in specific processor areas. For example, dynamic voltage scaling and dynamic frequency scaling may be employed to reduce a processor core voltage and clock rate, respectively, to lower processor power consumption, albeit at lower processor performance.

As the cost of power increases, data center operators are increasingly challenged to lower data center power requirements. Along with lowering data center power requirements, data center operators also need to ensure an adequate number of servers are deployed to support existing and new business. To address these conflicting goals, data center operators have implemented power management approaches that monitor and coordinate power distribution to servers of a data center. In general, conventional power management approaches have employed server power capping to protect a power distribution system from overdraw and to facilitate effective use of available power such that the number of servers (e.g., in a server rack) can be increased without exceeding branch circuit capacity.

Recently, storage infrastructure has been growing at a rate of nearly sixty percent per year to meet increasing demand for storage. In general, storage is consuming a larger portion (around forty percent at present) of total information technology (IT) power, placing additional stress on already strained power delivery systems. Typically, additional storage capacity has been realized via additional (and/or higher capacity) storage devices that consume additional power. At least one conventional storage subsystem has attempted to reduce power consumption by spinning-down hard disk drives (HDDs) when access to the HDDs is sparse, irrespective of a current power consumption of the storage subsystem.

BRIEF SUMMARY

Disclosed are a method, a storage subsystem, and a computer program product (embodied on a computer-readable storage medium) for performing storage power management.

A technique for performing storage power management on storage subsystems includes measuring, using a power measurement device, power consumption of a storage subsystem. A first average power (shorter time average power) and a second average power (longer time average power) for the storage subsystem are calculated based on the measured power consumption. In this case, the first average power is calculated over a shorter time period than the second average power. One or more first (e.g., fast) actuators are incremented in response to the first average power of the storage subsystem being greater than a first power level to reduce the first average power of the storage subsystem below the first power level within a first time period (e.g., less than about one-hundred milliseconds). One or more second (e.g., slow) actuators are incremented in response to the second average power of the storage subsystem being greater than a second power level and less than the first power level to reduce the second average power of the storage subsystem below the second power level within a second time period (e.g., less than about ten seconds). Finally, one or more of the first actuators and the second actuators are decremented in response to the second average power of the storage subsystem being more than an offset below the second power level to increase the power consumption of the storage subsystem.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a storage subsystem, and a computer program product (embodied on a computer-readable storage medium) for performing storage power management.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

The present disclosure is generally directed to techniques for power measurement driven storage subsystem power capping. According to the present disclosure, power and performance of a storage subsystem are adjusted to achieve a desired externally set power cap. In general, conventional storage subsystems have been incapable of utilizing an externally set power cap to achieve power proportionality. According to the present disclosure, power consumption of a storage subsystem is periodically measured to ensure that both electrical and thermal power caps are not being violated and that power consumption is not significantly lower than a set thermal power cap. In various embodiments, appropriate actuators are activated (incremented or decremented) to maintain the integrity of the power delivery system and to achieve a power proportional storage subsystem. An electrical power cap (which sets a power level for a power 'emergency' violation) may be measured, for example, against a one-hundred millisecond power average and a thermal power cap (which sets a power level for a power 'budget' violation) may be is measured, for example, against a thirty second power average. In general, any adverse effects of implementing a thermal power cap, which governs performance of a storage subsystem via long-term average power consumption, can be mitigated by ensuring fast actuators maintain power supply integrity.

According to the present disclosure, techniques are employed to: reduce power consumption of storage subsystems; facilitate better power management of storage subsystems; and reduce branch circuit damage of branch circuits that provide power to storage subsystems. The disclosed techniques facilitate power-proportional storage subsystems where power consumption can be balanced with performance to better manage storage subsystem power consumption and to achieve externally set power caps. The disclosed techniques periodically monitor power consumption of a storage subsystem to ensure power branch circuit integrity is maintained.

In various embodiments, two sets of actuators with different responsiveness are implemented via a power management application. For example, fast actuators (e.g., that act within less than about one-hundred milliseconds) and slow actuators (e.g., that act within less than about ten seconds) may be employed alone or in conjunction with each other. When power consumption of a storage subsystem is too great (i.e., a power emergency), fast actuators are activated to ensure a power delivery infrastructure (e.g., a branch circuit) is not damaged by restricting the length of time power violations are allowed. By definition, when all implemented fast actuators are fully activated power consumption of a storage subsystem is below a power emergency level.

As one example of a fast actuator, an acoustic mode (or modes) of hard disk drives (HDDs) can facilitate implementation of a fast actuator to reduce power requirements of a storage subsystem when a power emergency occurs. As another example, throttling input/output (I/O) requests to a storage subsystem can facilitate implementation of a fast actuator (with or without invoking one or more acoustic modes of one or more HDDs of the storage subsystem) to reduce power requirements of the storage subsystem when a power emergency occurs. In various power emergencies, multiple fast actuators may be implemented in series or in parallel. When I/O requests to a storage subsystem are throttled, a lower bound on the throttling of I/O requests may be set to ensure that useful work can still be performed (i.e., I/O requests cannot be throttled to zero if the performance of useful work is desired).

Various slow actuators may also be employed (alone or in combination with fast actuators) to facilitate better power budget management depending on the application. For example, slow actuators may be implemented by: storing frequently accessed data in one or more solid state devices (SSDs) such that fewer HDD accesses are incurred; and reducing active (and seek) power consumption by spinning down HDDs. Data may also be consolidated onto a smaller number of HDDs to attain maximum HDD spin-down savings. However, it should be appreciated that spinning down HDDs is not desirable when all HDDs of a storage subsystem are being accessed. Moreover, when all HDDs are already spun-down for energy saving purposes, other actuators may need to be employed to achieve a power cap.

Fast and slow actuators may be triggered in series or in parallel to achieve a desired power cap. In a typical embodiment, an assumption is made that an HDD acoustic mode has a one to ten millisecond response time and I/O duty cycle never goes to zero (in order to continue servicing incoming I/O requests). In general, drive spin-down requests should not be issued so frequently as to adversely effect the integrity of the HDDs of a storage subsystem.

Figure 1:
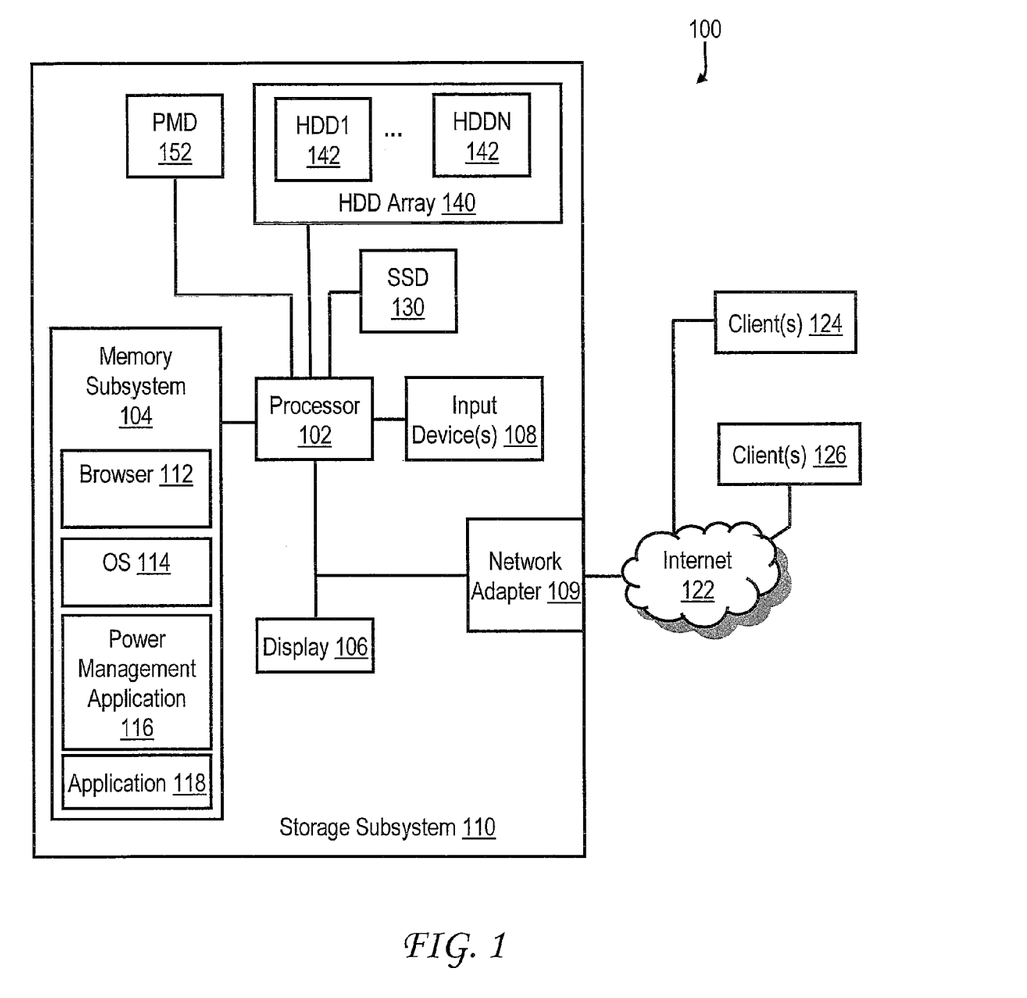
FIG. 1 is a diagram of a relevant portion of an exemplary storage subsystem environment that includes a storage subsystem that implements storage power management in accordance with various embodiments of the present disclosure.

With reference to FIG. 1, an exemplary data storage environment 100 is illustrated that includes a storage subsystem 110 that is configured to implement power management according to one or more embodiments of the present disclosure. Storage subsystem 110 may take various forms, such as a storage area network (SAN), network-attached storage (NAS), or a combination thereof. Storage subsystem 110 includes a processor 102 (which may include one or more processor cores for executing program code) coupled to a memory subsystem 104, a display 106, one or more input devices 108, a hard disk drive (HDD) array 140 including HDDs 142 (which may be magnetic and/or optical drives), a power measurement device (PMD) 152 such as a power meter, a solid state device (SSD) 130, and a network adapter 109.

Memory subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Memory subsystem 104 includes an operating system (OS) 114 for storage subsystem 110, a power management application 116, and also includes application programs, such as a browser 112 (which may optionally include customized plug-ins to support various client applications), and other applications (e.g., a word processing application, a presentation application, and an email application) 118. As is further described herein, power management application 116 employs one or more fast/slow actuators to manage power consumption of storage subsystem 110.

Display 106 may be, for example, a cathode ray tube (CRT) or a liquid crystal display (LCD). Input device(s) 108 of storage subsystem 110 may include, for example, a mouse, a keyboard, haptic devices, and/or a touch screen. Network adapter 109 supports communication of storage subsystem 110 with one or more wired and/or wireless networks utilizing one or more communication protocols, such as 802.x, HTTP, simple mail transfer protocol (SMTP), etc. Storage subsystem 110 is shown coupled via one or more wired or wireless networks, such as the Internet 122, to various clients 124 and 126 that access information of interest (to users of clients 124 and 126) that is stored in storage subsystem 110. In addition, clients 124 and 126 (or another device) may be employed to provide external power caps to storage subsystem 110. As is described in further detail herein, SSD 130 may be advantageously utilized to reduce accesses to HDDs 142 in certain applications. For example, frequently accessed data may be off-loaded from HDDs 142 to SSD 130 to allow one or more HDDs 142 of HDD array 140 to be spun-down.

Those of ordinary skill in the art will appreciate that the hardware components and basic configuration depicted in FIG. 1 may vary. The illustrative components within storage subsystem 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
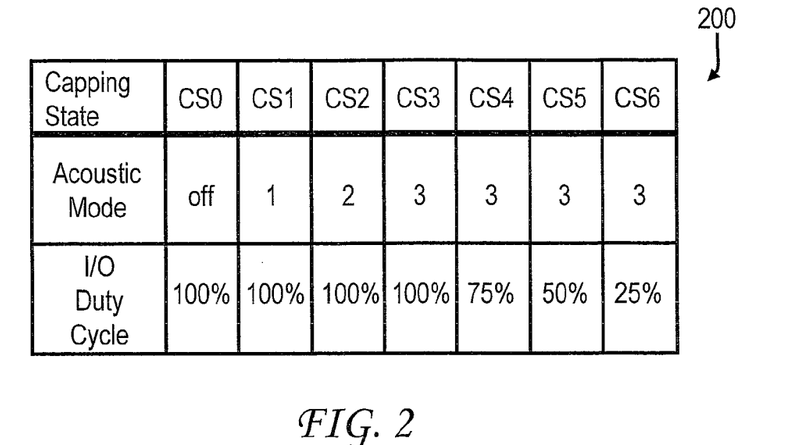
FIG. 2 is a diagram for implementing storage power management in accordance with an embodiment of the present disclosure.

With reference to FIG. 2, table 200 illustrates a number of storage power capping states (c-states) for exemplary fast actuators implemented according to an embodiment of the present disclosure to facilitate storage power management. Specifically, table 200 depicts seven c-states CS0-CS6 for fast actuators that correspond to HDD acoustic modes and throttling of I/O requests to storage subsystem 110. In c-state CS0, I/O requests are not throttled (i.e., 100% of I/O requests are issued) and an HDD acoustic mode is off. In the example illustrated in FIG. 2, HDDs of the storage subsystem have three acoustic modes (i.e., modes '1', '2', and '3'). In this example, an HDD in a first acoustic mode (i.e., mode '1') consumes more power than an HDD in a second acoustic mode (i.e., mode '2'). Similarly, an HDD in the second acoustic mode consumes more power than an HDD in a third acoustic mode (i.e., mode '3'). According to the present disclosure, an HDD may include more or less than three acoustic modes. Moreover, while the term 'acoustic mode' is utilized herein, the techniques disclosed herein are applicable to other HDD modes (e.g., idle modes) that may be employed to reduce power consumption of an HDD.

HDDs are placed in the first acoustic mode in c-state CS1, when a shorter time average power of storage subsystem 110 exceeds a level that indicates a power emergency. When the shorter time average power of storage subsystem 110 continues to indicate a power emergency, the second acoustic mode is entered in c-state CS2. Similarly, when the shorter time average power of storage subsystem 110 continues to indicate a power emergency, the third acoustic mode is entered in c-state CS3. Following c-state CS3, I/O throttling is employed in c-states CS4-CS6, as needed. More specifically, in c-state CS4, throttling of I/O requests to storage subsystem 110 is implemented and only 75% of I/O requests are actually issued to storage subsystem 110. In c-state CS5, throttling of I/O requests to storage subsystem 110 is increased to 50%. In c-state CS6, throttling of I/O requests to storage subsystem 110 is increased to 75% (i.e., only 25% of I/O requests are actually issued to storage subsystem 110).

It is contemplated that changes in HDD acoustic modes of a storage subsystem and throttling of I/O requests to a storage subsystem may be employed in larger or smaller steps. It is also contemplated that a greater or lesser number of c-states may employed for the fast actuators and that additional fast actuators may be utilized. It is further contemplated that the fast actuators may be implemented in a different order (i.e., I/O throttling may be implemented before acoustic modes are implemented) and that multiple fast actuators may be incremented or decremented in a same c-state. It should appreciated that the fast actuators in table 200 of FIG. 2 are fully activated in c-state CS6.

Figure 3:
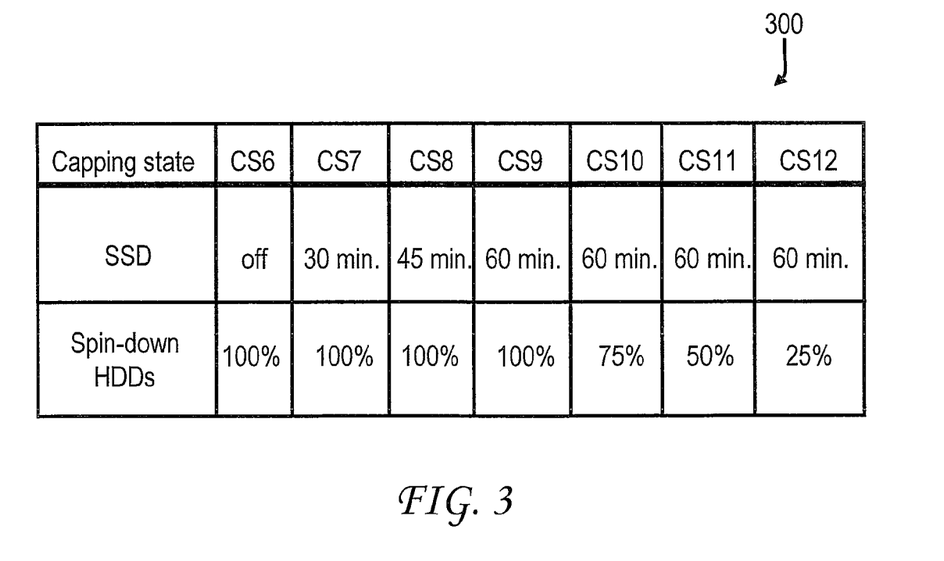
FIG. 3 is a diagram for implementing storage power management in accordance with another embodiment of the present disclosure.

With reference to FIG. 3, table 300 illustrates a number of c-states for exemplary slow actuators implemented according to an embodiment of the present disclosure to facilitate storage power management. Specifically, table 300 depicts seven c-states CS6-CS12 for slow actuators that correspond to implementing SSD 130 and spinning down HDDs 142 of storage subsystem 110. It should be appreciated that the c-state CS6 of table 300 corresponds to the c-state CS6 of table 200 of FIG. 2. That is, in this example, utilization of the slow actuators begins in c-state CS7, following full activation of the fast actuators. It is contemplated that one or more slow actuators may be adjusted during a same c-state as one or more fast actuators.

In c-state CS7, SDD 130 is utilized to offload frequently accessed data from HDDs 142 using an interval of thirty minutes (in which frequently accessed data is replaced in SDD 130) to reduce power requirements for storage subsystem 110. In c-state CS8, when power consumption of storage subsystem 110 has not fallen below a desired level, an interval of forty-five minutes (in which frequently accessed data is replaced in SDD 130) is utilized to further reduce power requirements for storage subsystem 110. In c-state CS9, when power consumption of storage subsystem 110 has not fallen below a desired level, an interval of sixty minutes (in which frequently accessed data is replaced in SDD 130) is utilized to further reduce power requirements for storage subsystem 110. It is contemplated that the replacement interval for data stored in SSD 130 may vary above or below the example values. In any case, an interval in which data is moved from HDDs 142 to SSD 130 (assuming capacity is available) is extended in an attempt to further reduce power consumption for storage subsystem 110 when a longer time average power for storage subsystem 110 is not reduced below a desired level in a given c-state.

In c-state CS10, when the longer time average power of storage subsystem 110 has not fallen below a desired level, spin-down of HDDs 142 of storage subsystem 110 is commenced and 25% of HDDs 142 are spun-down (i.e., 75% of the HDDs remain spun-up). In c-state CS11, when the longer time average power of storage subsystem 110 has not fallen below the desired level, spin-down of HDDs 142 of storage subsystem 110 is increased to 50% (i.e., 50% of HDDs 142 remain spun-up). In c-state CS12, when the longer time average power of storage subsystem 110 has not fallen below the desired level, spin-down of HDDs 142 of storage subsystem 110 is increased to 75% (i.e., 25% of HDDs 142 remain spun-up). It is contemplated that interval changes for the replacement of data in SSD 130 and changes in the percentage of HDDs 142 that are spun-down may be employed in larger or smaller increments. It is also contemplated that a greater or lesser number of c-states may employed for the slow actuators and that additional slow actuators may be utilized. It is further contemplated that the slow actuators may be implemented in a different order and that multiple slow actuators may be adjusted in a same c-state. It should appreciated that the slow actuators in table 300 of FIG. 3 are fully activated in c-state CS12.

Figure 4:
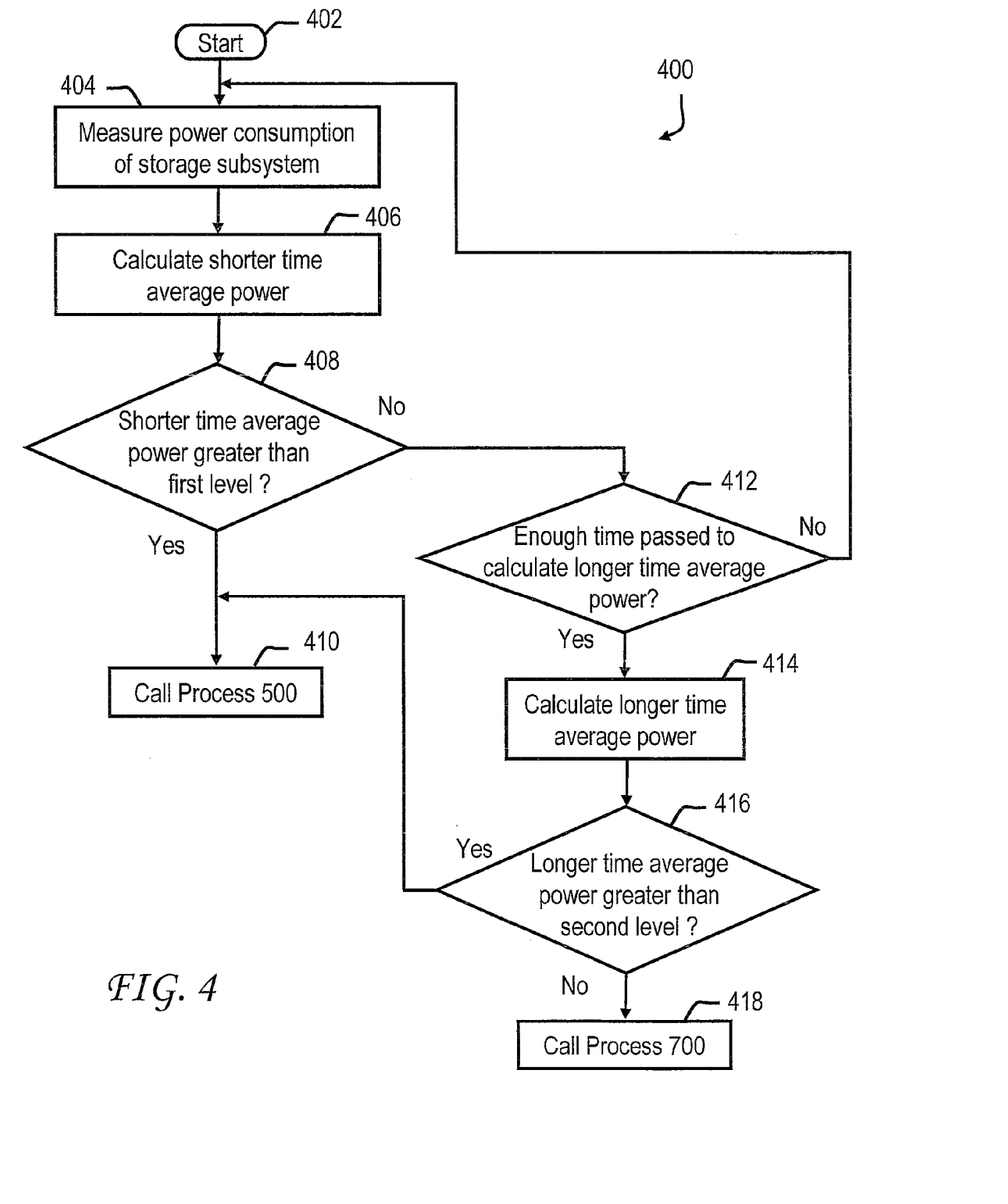
FIG. 4 is a flow chart of an exemplary process for implementing storage power management according to one embodiment of the present disclosure.

With reference to FIG. 4, a flow chart for an exemplary process 400 that implements storage power management, according to various embodiments of the present disclosure, is illustrated. For ease of understanding, process 400 is explained in conjunction with FIGS. 1-3. Process 400 (which is periodically executed while storage subsystem 110 is powered) is initiated at block 402. Next, in block 404 power consumption of storage subsystem 110 is measured. For example, processor 102 (executing power management application 116) may initiate periodic power measurements for storage subsystem 110 using power measurement device (PMD) 152. Then, in block 406 processor 102 calculates a shorter time average power (e.g., a one-hundred millisecond power average) for storage subsystem 110. Next, in decision block 408, processor 102 determines whether the shorter time average power of storage subsystem 110 is greater than a first power level (i.e., an electrical power cap).

In one or more embodiments, the first power level corresponds to an externally set power cap. In response to the shorter time average power of storage subsystem 110 being greater than the first power level in block 408, a power emergency is indicated and control transfers to block 410. In block 410, process 500 (which is described in further detail below in conjunction with FIG. 5) is called. In response to the shorter time average power of storage subsystem 110 not being greater than the first power level in block 408, control transfers to decision block 412. In block 412, processor 102 determines whether enough time has passed to calculate a longer time average power (e.g., a thirty second power average) for storage subsystem 110. In response to enough time not passing to calculate the longer time average power in block 412, control transfers to block 404.

In response to enough time passing to calculate the longer time average power in block 412, control transfers to block 414 where processor 102 calculates the longer time power average. Next, in decision block 416 processor 102 determine whether the longer time average power of storage subsystem 110 is greater than a second power level (i.e., a thermal power cap). In response to the longer time average power of storage subsystem 110 being greater than the second power level in block 416, control transfers to block 410 where process 500 (see FIG. 5) is called. In block 416, in response to the longer time average power of storage subsystem 110 being below the second power level, control transfers to block 418 where process 700 (which is described in further detail below in conjunction with FIG. 7) is called to ensure that the power consumption of storage subsystem 110 is not significantly lower than the second power level.

Figure 5:
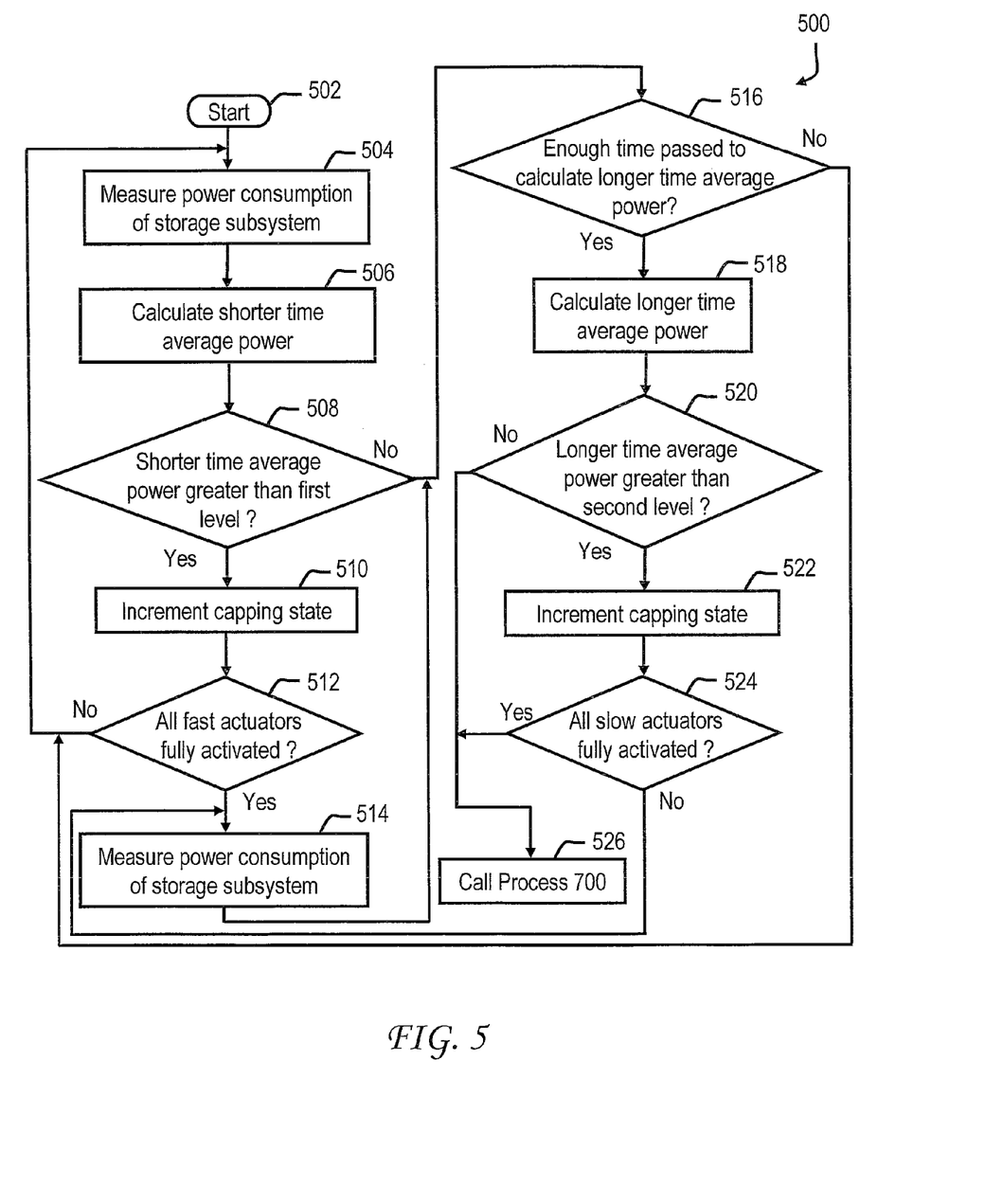
FIG. 5 is a flow chart of an exemplary process for implementing storage power management according to another embodiment of the present disclosure.

With reference to FIG. 5, a flow chart for an exemplary process 500 that implements storage power management, according to various embodiments of the present disclosure, is illustrated. For ease of understanding, process 500 is explained in conjunction with FIGS. 1-3. Process 500 is initiated at block 502 in response to a call from process 400 of FIG. 4. Next, in block 504 the power consumption of storage subsystem 110 is measured by processor 102 using PMD 152. Initial execution of block 504 may be omitted if desired, as process 400 measures the power consumption of storage subsystem 110 prior to calling process 500. Then, in block 506 processor 102 calculates the shorter time average power.

Next, in decision block 508, processor 102 determines whether the shorter time average power of storage subsystem 110 is greater than a first power level (i.e., an electrical power cap indicative of a power emergency violation). In various embodiments, the first power level corresponds to an externally set power cap. In response to a power emergency being indicated in block 508, control transfers to block 510, where a c-state is incremented (e.g., one or more fast actuators are incremented (see table 200 of FIG. 2)). For example, a c-state may be incremented from c-state CS0 to c-state CS1. As another example, a c-state may be incremented from c-state CS0 to c-state CS6.

As mentioned above, one or more fast actuators may be implemented by activating one or more acoustic modes of one or more of HDDs 142 of HDD array 140 and/or throttling I/O requests to HDDs 142. Next, in decision block 512, processor 102 determines whether all implemented fast actuators are fully activated (e.g., whether c-state CS6 of FIG. 2 has been reached). In one or more embodiments, by definition, when all implemented fast actuators are fully activated, the shorter time average power of storage subsystem 110 is below the first power level. In response to all of the fast actuators not being fully activated in block 510, control returns to block 504 where the power consumption of storage subsystem 110 is again measured.

In response to all of the fast actuators being fully activated in block 512, control transfers to block 514 where the power consumption of storage subsystem 110 is again measured (in preparation for determining whether slow actuators require activation in order to further reduce power consumption of storage subsystem 110 below a second power level). Following block 514 control transfers to decision block 516. In block 516 processor 102 determines whether enough time has passed to calculate a longer time average power for storage subsystem 110. In response to enough time not passing to calculate the longer time average power in block 516, control transfers to block 504. In response to enough time passing to calculate the longer time average power in block 516, control transfers to block 518. In response to a power emergency violation not being indicated in block 508, control transfers directly to block 516.

In block 518 processor 102 calculates the longer time average power for storage subsystem 110. Next, in decision block 520, processor 102 determines whether the longer time average power of storage subsystem 110 is greater than a second power level (i.e., a thermal power cap indicative of a power budget violation). In response to the longer time average power of storage subsystem 110 being greater than the second power level in block 520, control transfers to block 522 where the c-state is incremented (e.g., slow actuators are incremented) in an attempt to further reduce power consumption of storage subsystem 110 (see table 300 of FIG. 3)) below the second power level. For example, with reference to FIG. 3, a c-state may be changed from c-state CS6 to c-state CS7. As another example, with reference to FIG. 3, a c-state may be changed from c-state CS6 to c-state CS9.

Figure 7:
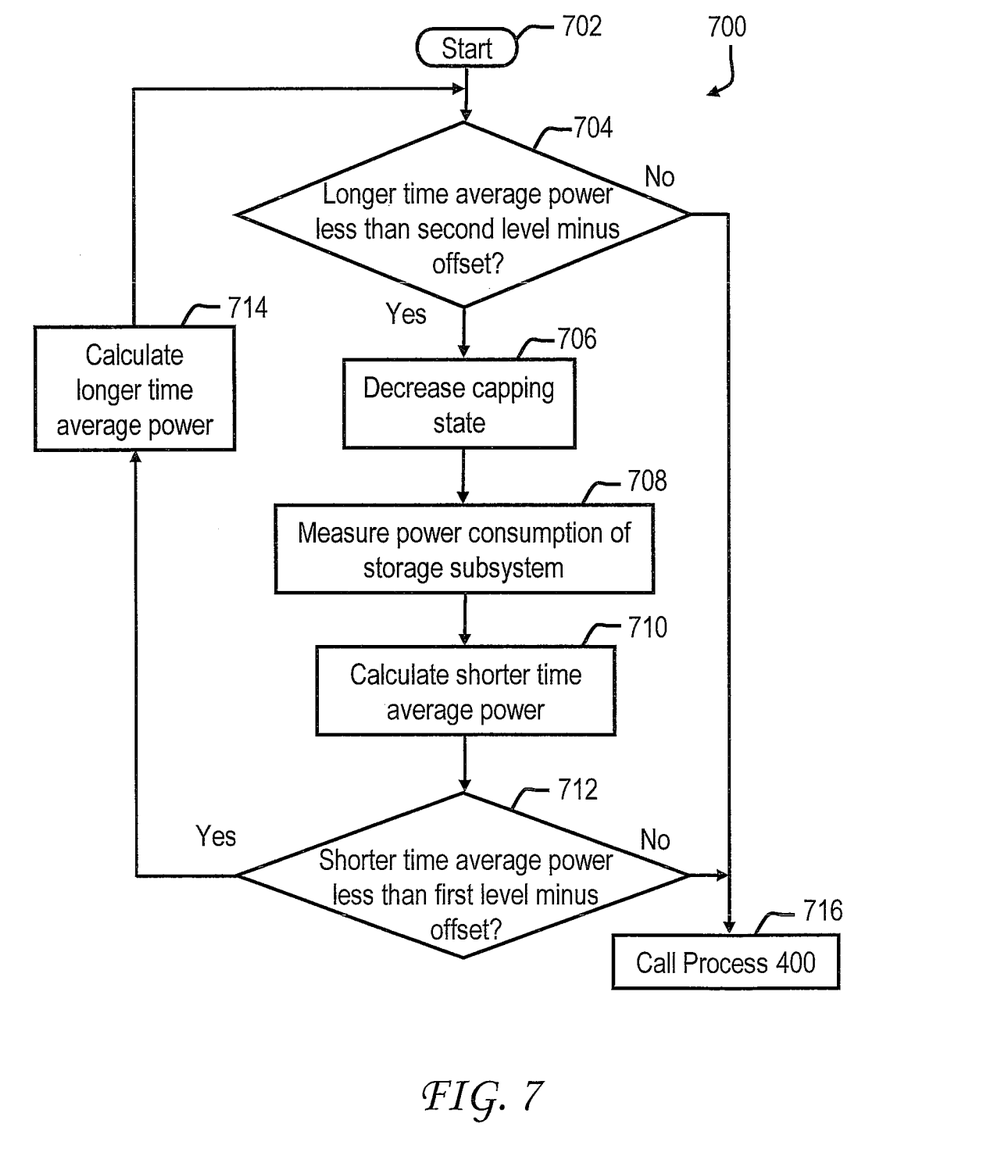
FIG. 7 is a flow chart of another exemplary process for implementing storage power management according to another embodiment of the present disclosure.

Next, in decision block 524, processor 102 determines whether all slow actuators are fully activated. By definition, when all implemented slow actuators are fully activated, the longer time average power of storage subsystem 110 is below the second power level. If all slow actuators are fully activated in block 524, control transfers to block 526, where process 700 is called. If all implemented slow actuators are not fully activated in block 524, control transfers to block 514 and then to block 516.

Figure 6:
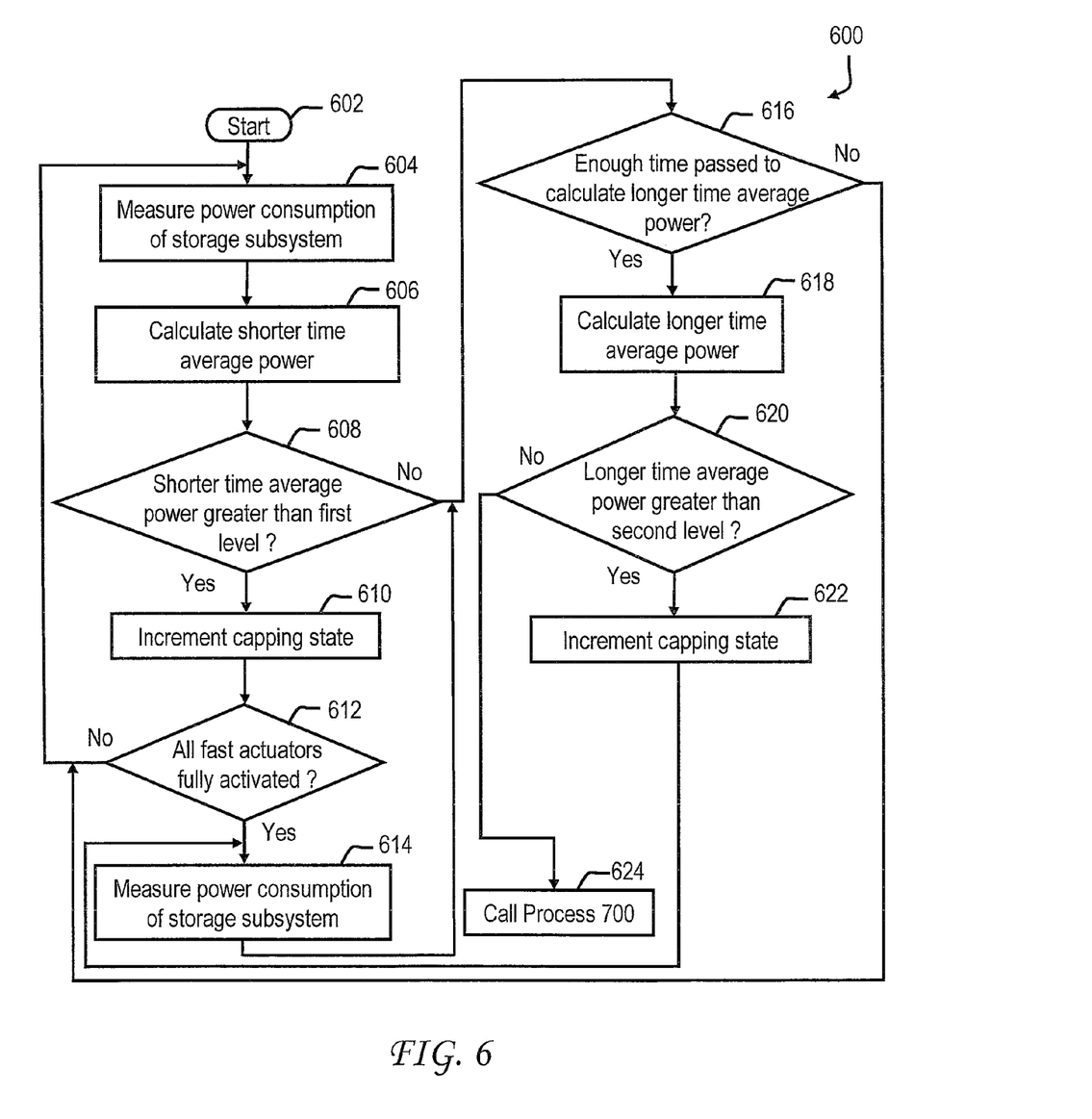
FIG. 6 is a flow chart of an exemplary process for implementing storage power management according to one aspect of the present disclosure.

With reference to FIG. 6, a flow chart for another exemplary process 600 that implements storage power management, according to various other embodiments of the present disclosure, is illustrated. Process 600 may be utilized as an alternative to process 500. For ease of understanding, process 600 is also explained in conjunction with FIGS. 1-3. Process 600 is initiated at block 602. Next, in block 604 the power consumption of storage subsystem 110 is measured by processor 102 using PMD 152. Initial execution of block 604 may be omitted if desired, as process 400 measures the power consumption of storage subsystem 110 prior to calling process 600. Then, in block 606 processor 102 calculates the shorter time average power. Next, in decision block 608, processor 102 determines whether the shorter time average power of storage subsystem 110 is greater than a first power level (i.e., an electrical power cap indicative of a power emergency violation). In various embodiments, the first power level corresponds to an externally set power cap. In response to a power emergency being indicated in block 608, control transfers to block 610, where a c-state is incremented (e.g., one or more fast actuators are incremented (see table 200 of FIG. 2)). For example, a c-state may be incremented from c-state CS1 to c-state CS3. As another example, a c-state may be incremented from c-state CS3 to c-state CS6.

As mentioned above, one or more fast actuators may be implemented by activating one or more acoustic modes of one or more of HDDs 142 of HDD array 140 and/or throttling I/O requests to HDDs 142. Next, in decision block 612, processor 102 determines whether all implemented fast actuators are fully activated (e.g., whether c-state CS6 of FIG. 2 has been reached). In one or more embodiments, by definition, when all implemented fast actuators are fully activated, the shorter time average power of storage subsystem 110 is below the first power level. In response to all of the fast actuators not being fully activated in block 610, control returns to block 604 where the power consumption of storage subsystem 110 is again measured. In response to all of the fast actuators being fully activated in block 612, control transfers to block 614 where the power consumption of storage subsystem 110 is again measured (in preparation for determining whether slow actuators require activation in order to further reduce power consumption of storage subsystem 110 below a second power level). Following block 614 control transfers to decision block 616. In block 616 processor 102 determines whether enough time has passed to calculate a longer time average power for storage subsystem 110. In response to enough time not passing to calculate the longer time average power in block 616, control transfers to block 604. In response to enough time passing to calculate the longer time average power in block 616, control transfers to block 618. In response to a power emergency violation not being indicated in block 608, control transfers directly to block 616.

In block 618 processor 102 calculates the longer time average power for storage subsystem 110. Next, in decision block 620, processor 102 determines whether the longer time average power of storage subsystem 110 is greater than a second power level (i.e., a thermal power cap indicative of a power budget violation). In response to the longer time average power of storage subsystem 110 being greater than the second power level in block 620, control transfers to block 622 where the c-state is incremented (e.g., fast and/or slow actuators are incremented) in an attempt to further reduce the longer time average power of storage subsystem 110 (see table 300 of FIG. 3)) below the second power level. For example, with reference to FIG. 3, a c-state may be changed from c-state CS6 to c-state CS7. As another example, with reference to FIG. 3, a c-state may be changed from c-state CS5 to c-state CS9.

Following block 622, control transfers to block 614. In block 620, in response to the longer time average power of storage subsystem 110 being less than the second power level control transfers to block 624, where process 700 is called to determine whether performance of power system 110 may be improved. It should be appreciated that process 600 may continue to utilize fast actuators (when available) to reduce the longer time average power of storage subsystem 110 below the second power level. In contrast, process 500 only utilizes slow actuators (even if fast actuators are available) when the longer time average power of storage subsystem 110 is below the first power level.

With reference to FIG. 7, a flow chart for another exemplary process 700 that implements storage power management, according to various other embodiments of the present disclosure, is illustrated. For ease of understanding, process 700 is also explained in conjunction with FIGS. 1-3. Process 700 is initiated at block 702 in response to a call from process 400 (see FIG. 4), a call from process 500 (see FIG. 5), or a call from process 600 (see FIG. 6) that is, for example, initiated in response to a longer time average power of storage subsystem 110 being less than a second power level.

Next, in decision block 704, processor 102 determines if the longer time average power of storage subsystem 110 is less than the second power level minus an offset. The offset is selected to prevent frequent readjustment of c-states that leads to the longer time average power for storage subsystem 110 alternating between exceeding the second power level immediately followed by the longer time average power for storage subsystem 110 dropping below the second power level during successive power consumption measurements. In general, the offset used in block 704 is storage subsystem dependent. In response to the longer time average power for storage subsystem 110 not being less than the second power level minus the offset, control transfers from block 704 to block 716 where control returns to process 400 (see FIG. 4). In response to the second average power of storage subsystem 110 being less than the second power level minus the offset, control transfers from block 704 to block 706.

In block 706 processor 102 decreases a c-state of active actuators to increase the power consumption of storage subsystem 110. For example, with reference to FIG. 3, a c-state may be changed from c-state P11 to c-state P10. As another example, with reference to FIG. 3, a c-state may be changed from c-state P11 to c-state P8. Next, in block 708, processor 102 measures the power consumption of storage subsystem 110. For example, processor 102 (executing power management application 116) may utilize PMD 152 to measure the power consumption of storage subsystem 110. Then, in block 710, processor 102 calculates a shorter time average power for storage subsystem 110 (i.e., to ensure that the shorter timer average power is not exceeding an emergency power level).

From block 710, control transfers to decision block 712, where processor 102 determines whether the shorter time average power of storage subsystem 110 is less than the emergency power level minus another offset. In general, the offset used in block 712 is also storage subsystem dependent. In response to the shorter time average power not being less that the first level minus the offset in block 712, control transfers to block 716. In response to the shorter time average power being less that the first level minus the offset in block 712, control transfers to block 714. In block 714, processor 102 recalculates the longer time average power for storage subsystem 110. Following block 714 control transfers to block 704, which is discussed in detail above.

In the flow chart above, the methods depicted in FIGS. 4-7 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations of aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for performing storage power management on storage subsystems, comprising:

measuring, using a processor and a power measurement device, power consumption of a storage subsystem;

calculating a first average power and a second average power for the storage subsystem based on the measured power consumption, wherein the first average power is calculated over a shorter time period than the second average power;

incrementing, using the processor, one or more first actuators in response to the first average power of the storage subsystem being greater than a first power level to reduce the first average power of the storage subsystem below the first power level within a first time period;

incrementing, using the processor, one or more second actuators in response to the second average power of the storage subsystem being greater than a second power level and less than the first power level to reduce the second average power of the storage subsystem below the second power level within a second time period that is greater than the first time period;

decrementing, using the processor, one or more of the first actuators and the second actuators in response to the second average power of the storage subsystem being more than an offset below the second power level to increase the power consumption of the storage subsystem, wherein a responsiveness of the first actuators is faster than a responsiveness of the second actuators; and incrementing one or more of the first actuators prior to incrementing one or more of the second actuators in response to the first average power of the storage subsystem being less than the first power level and the second average power of the storage subsystem being greater than the second power level.

2. The method of claim 1, wherein the incrementing, using the processor, one or more first actuators further comprises:

placing hard disk drives of the storage subsystem into one or more acoustic modes.

3. The method of claim 2, wherein the incrementing, using the processor, one or more first actuators further comprises:

throttling input/output (I/O) requests to the storage subsystem.

4. The method of claim 1, wherein the incrementing, using the processor, one or more second actuators further comprises:

writing frequently accessed data of the storage subsystem to a solid state device (SSD).

5. The method of claim 4, wherein the incrementing, using the processor, one or more second actuators further comprises:

spinning-down unused hard disk drives of the storage subsystem.

6. The method of claim 1, wherein the decrementing is only performed in response to the first average power being more than another offset below the first power level.

7. The method of claim 1, wherein the storage subsystem includes one or more optical drives or one or more magnetic drives.

8. The method of claim 1, wherein the storage subsystem includes one or more solid state devices and the incrementing, using the processor, one or more first actuators further comprises:

throttling input/output (I/O) requests to the solid state devices.

9. A computer program product for performing storage power management on a storage subsystem, the computer program product comprising:

a computer-readable storage medium having computer-readable program code embodied thereon, wherein the computer-readable program code, when executed by a processor, causes the processor to:

measure, using a power measurement device, power consumption of the storage subsystem;

calculate a first average power and a second average power for the storage subsystem based on the measured power consumption, wherein the first average power is calculated over a shorter time period than the second average power;

increment one or more first actuators in response to the first average power of the storage subsystem being greater than a first power level to reduce the first average power of the storage subsystem below the first power level within a first time period;

increment one or more second actuators in response to the second average power of the storage subsystem being greater than a second power level and less than the first power level to reduce the second average power of the storage subsystem below the second power level within a second time period that is greater than the first time period;

decrement one or more of the first actuators and the second actuators in response to the second average power of the storage subsystem being more than an offset below the second power level to increase the power consumption of the storage subsystem, wherein a responsiveness of the first actuators is faster than a responsiveness of the second actuators; and increment the first actuators prior to incrementing the second actuators in response to the first average power of the storage subsystem being less than the first power level and the second average power of the storage subsystem being greater than the second power level.

10. The computer program product of claim 9, wherein the computer-readable program code, when executed by the processor, further causes the processor to increment the first actuators by:

placing hard disk drives of the storage subsystem into an acoustic mode; and throttling input/output (I/O) requests to the storage subsystem.

11. The computer program product of claim 9, wherein the computer-readable program code, when executed by the processor, further causes the processor to increment the second actuators by:

writing frequently accessed data of the storage subsystem to a solid state device (SSD); and spinning-down unused hard disk drives of the storage subsystem.

12. The computer program product of claim 9, wherein the decrementing is only performed in response to the first average power being more than another offset below the first power level.

13. The computer program product of claim 9, wherein the storage subsystem includes one or more solid state devices and the computer-readable program code, when executed by the processor, further causes the processor to:

throttle input/output (I/O) requests to the solid state devices.

14. A storage subsystem, comprising:
a memory for storing code; and
a processor coupled to the memory, wherein the processor is configured to:

measure, using a power measurement device, power consumption of the storage subsystem;

calculate a first average power and a second average power for the storage subsystem based on the measured power consumption, wherein the first average power is calculated over a shorter time period than the second average power;

increment one or more first actuators in response to the first average power of the storage subsystem being greater than a first power level to reduce the first average power of the storage subsystem below the first power level within a first time period;

increment one or more second actuators in response to the second average power of the storage subsystem being greater than a second power level and less than the first power level to reduce the second average power of the storage subsystem below the second power level within a second time period that is greater than the first time period;

decrement one or more of the first actuators and the second actuators in response to the second average power of the storage subsystem being more than an offset below the second power level to increase the power consumption of the storage subsystem, wherein a responsiveness of the first actuators is faster than a responsiveness of the second actuators; and increment the first actuators prior to incrementing the second actuators in response to the first average power of the storage subsystem being less than the first power level and the second average power of the storage subsystem being greater than the second power level.

15. The storage subsystem of claim 14, wherein the processor is further configured to increment the one or more first actuators by:

placing hard disk drives of the storage subsystem into an acoustic mode; and throttling input/output (I/O) requests to the storage subsystem.

16. The storage subsystem of claim 14, wherein the processor is further configured to increment the one or more second actuators by:

writing frequently accessed data of the storage subsystem to a solid state device (SSD); and spinning-down unused hard disk drives of the storage subsystem.

17. The storage subsystem of claim 14, wherein the decrementing is only performed in response to the first average power being more than another offset below the first power level.

18. The storage subsystem of claim 14, wherein the storage subsystem includes one or more solid state devices and the processor is further configured to:

throttle input/output (I/O) requests to the solid state devices.

* * * * *